(12) United States Patent
Beckstrom et al.

(10) Patent No.: US 7,330,429 B2
(45) Date of Patent: Feb. 12, 2008

(54) METHOD AND APPARATUS FOR INTERNET PROTOCOL TRANSACTION ROUTING

(75) Inventors: Robert Beckstrom, Bolingbrook, IL (US); Jeff Hodson, Wheaton, IL (US); Anthony Dezonno, Bloomingdale, IL (US)

(73) Assignee: Rockwell Electronic Commerce Technologies, Inc., Wood Dale, IL (US)

( * ) Notice: Subject to any disclaimer, the term of this patent is extended or adjusted under 35 U.S.C. 154(b) by 574 days.

(21) Appl. No.: 10/974,342

(22) Filed: Oct. 27, 2004

(65) Prior Publication Data

US 2006/0088024 A1 Apr. 27, 2006

(51) Int. Cl.
*H04L 12/56* (2006.01)

(52) U.S. Cl. .................. 370/230; 370/395.21; 370/412; 709/226

(58) Field of Classification Search .............. 370/229, 370/230, 230.1, 235, 412, 415, 416, 395.2, 370/395.21; 709/226, 240
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,006,264 A * | 12/1999 | Colby et al. | 709/226 |
| 6,016,307 A | 1/2000 | Kaplan et al. | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |

(Continued)

OTHER PUBLICATIONS

Hiroyuki Ohsaki and Mitsushige Morita, On Modeling Round-Trip Time Dynamics of the Internet Using System Identification, Jan. 2002, 9 Pages, vol. E85-B, No. 1.

*Primary Examiner*—Min Jung
(74) *Attorney, Agent, or Firm*—Welsh & Katz, Ltd.

(57) ABSTRACT

In one embodiment, a method for providing optimal transaction routing for data packets through a network on a plurality of logical pipes includes assigning each data packet to one of the plurality of logical pipes, with each logical pipe having an assigned numerical service level, and associating a numerical priority-usage level to each of the data packets. The method then includes establishing a threshold return-time-out (RTO) amount for each logical pipe, and transmitting data packets from one of the logical pipes and evaluating a running estimate of round trip times (RTT) for the transmitted data packets from the logical pipe being serviced. The method further includes transitioning to a subsequent logical pipe in a round robin manner once a combination of numerical bandwidth-usage levels for the delivered data packets has equaled or exceeded the numerical service level for the logical pipe being serviced or once that the current estimate of the round trip times for the delivered packets has equaled or exceeded the threshold RTO for the logical pipe being serviced.

24 Claims, 2 Drawing Sheets

U.S. PATENT DOCUMENTS

| | | |
|---|---|---|
| 6,345,305 B1 | 2/2002 | Beck et al. |
| 6,353,616 B1 * | 3/2002 | Elwalid et al. ............. 370/443 |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,690,676 B1 * | 2/2004 | Gulick ....................... 370/458 |
| 6,732,156 B2 | 5/2004 | Miloslavsky |
| 6,958,998 B2 * | 10/2005 | Shorey .................. 370/395.42 |
| 7,159,219 B2 * | 1/2007 | Chen et al. .................. 718/103 |
| 2002/0044553 A1 | 4/2002 | Chakravorty |
| 2002/0064161 A1 * | 5/2002 | Kim ....................... 370/395.21 |
| 2002/0112073 A1 * | 8/2002 | MeLampy et al. .......... 709/240 |
| 2004/0179535 A1 * | 9/2004 | Bertagna ............... 370/395.21 |

* cited by examiner

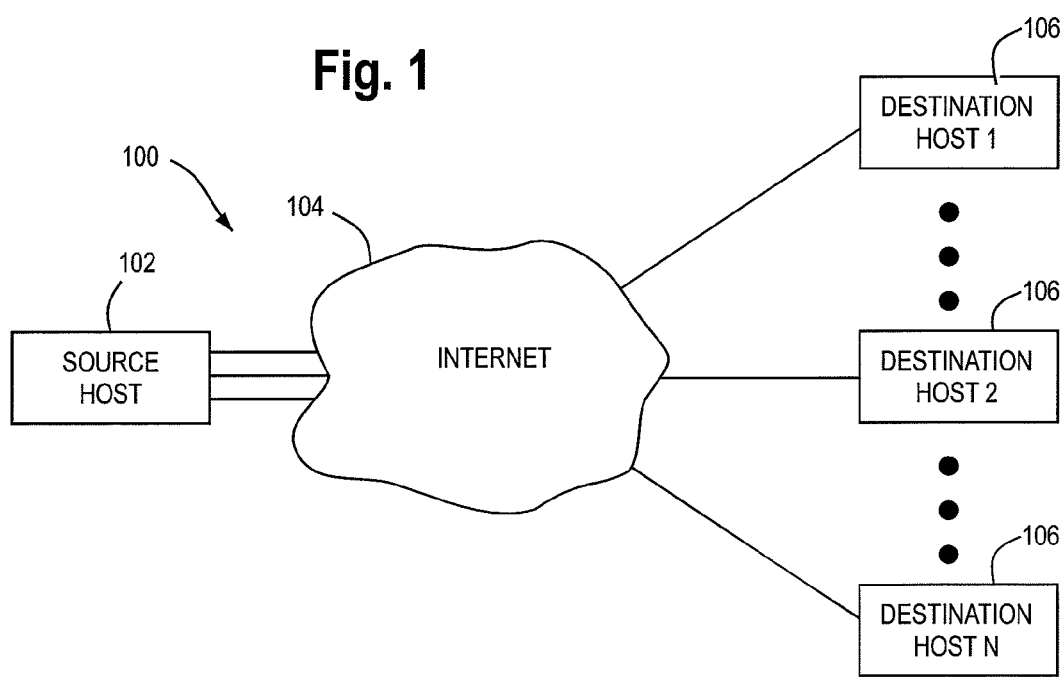
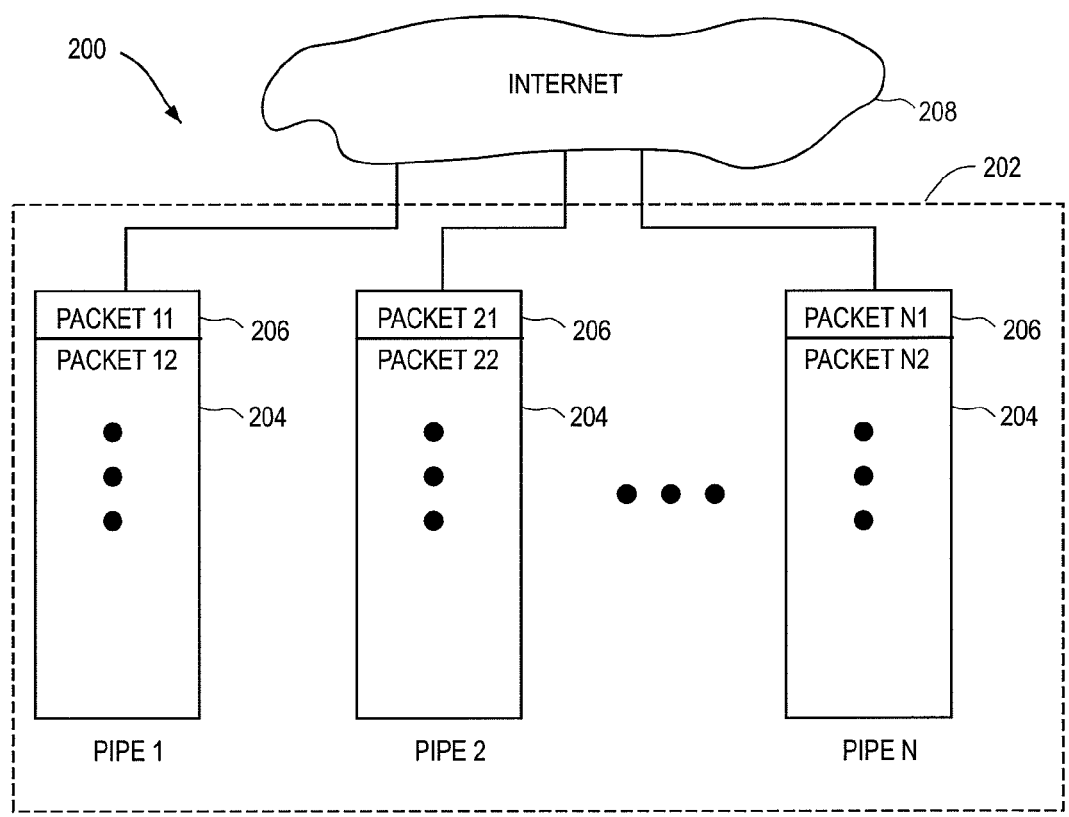

METHOD AND APPARATUS FOR INTERNET PROTOCOL TRANSACTION ROUTING

FIELD OF THE INVENTION

The present invention generally relates to Internet protocol (IP) communication and, more particularly, to a method and apparatus for optimization of transaction IP routing.

BACKGROUND OF THE INVENTION

Routing is the technique by which a transaction data packet finds its way form one host computer/server to another in the Internet. A data packet may mean any packet, text message, video, voice, or the like. In the Internet there are three major aspects of routing: a physical address determination, a selection of inter-network routers and gateways, and symbolic and numeric addresses.

The first of these is important when an IP data packet is to be transmitted from a computer. The IP data packet is typically encapsulated within whatever frame format is in use on the local network or networks to which the computer is attached. This encapsulation clearly requires the inclusion of a local network address or physical address within the frame.

The second of these is necessary because the Internet consists of a number of local networks interconnected by one or more gateways. Such gateways, generally known as routers, sometimes have physical connections or ports onto many networks. The determination of the appropriate gateway and port for a particular IP packet is called routing and also involves gateways interchanging information in standard ways.

The third aspect, which involves address translation from a reasonably human friendly form to numeric IP addresses, is performed by a system known as the Domain Name System (DNS). If a computer/server is to transmit an IP packet, it encapsulates the packet in a frame appropriate to the physical medium of the network it is attached to. For the successful transmission of such a frame it is necessary to determine the physical address of the destination computer. This can be achieved fairly simply using a table that will map IP addresses to physical addresses, such a table may include addresses for IP nets and a default address as well as the physical addresses corresponding to the IP addresses of locally connected computers. Such a table could be configured into a file and read into memory at boot up time. However it is normal practice for a computer to use a protocol known as ARP (Address Resolution Protocol) and defined by the standard Request For Comments 826 (RFC 826) which established the conversion of network protocol addresses to 48-bit Ethernet addresses for transmission on Ethernet hardware (also known as STD0037). This is operated dynamically to maintain the translation table known as the ARP cache, which is useful to the routing process.

One of the main reasons for the prevalence of the Internet relates to its routing mechanism. Routing of the Internet has two key features: flexibility and scalability. The Internet provides dynamic routing based on the exchange of the routing information among routers. Routers, or gateways are computers/servers that contain some knowledge about the topology of the network and have the ability to "route" data packets between the networks they are aware of. For example, when a network route becomes unavailable because of some troubles, an alternative route will be prepared automatically. Also, the packet processing at the routers is simple (e.g., FIFO) to reduce the overhead of packet forwarding at the router. So from a users' point of view, any packet transmission delay is an important metric since it directly affects the end-to-end performance.

A Quality Of Service (QOS) approach gives an Internet Service Provider (ISP) control of how pipe's bandwidths are shared among different users. The ISP communicates its sharing policy to the users, and how delivery service typically depends also on other ISP's traffic, and on the destination path of a data packet. One QOS objective is to deliver high priority data packets either before or more efficiently than normal and low priority data packets. To achieve this goal, packet traffic shaping techniques and prioritization methods have been developed. Previous methods have partitioned access to the Internet network into logical pipes and a user incurs a cost for use of each of the logical pipes. However, current switching technologies used for the Internet do not provide a guaranteed quality of service. In addition, there is no apparent direct relationship between the cost for the connection and the quality of service, except for obvious level differences between a direct digital connection (e.g., ISDN) and an analog (modem) connection. Typical ISPs charges for Internet access tend to depend on a user's personal preference, that is either a fixed rate pricing with unlimited access or a rate pricing based only on connection time, i.e. usage-sensitive pricing. Unlike the fixed rate user preference, the case of usage-sensitive pricing for the cost for each transmitted packet typically limits over-usage of the pipes bandwidths, which may facilitate an improved Internet traffic via self-regulation. There are many known proposals for various examples of usage-sensitive pricing for the Internet.

In one example, the pipes differ primarily with respect to their usage-sensitive pricing to the users. Each user will select a pipe or pipes that offers the desired QOS level. Therefore, traffic can be accordingly heavy on the lowest priced pipes than on the highest priced pipes. A user might switch to higher priority pipes whenever a higher QOS level is desired, and vice-versa for a lower QOS level.

To accommodate packet routing via all the allocated logical pipes, a round robin (RR) queuing method has been widely utilized in the industry. In round robin queuing, a number of pipes are established for temporarily holding data packets while the data packets await delivery. These logical pipes are distributed in an appropriate hierarchy from the highest priority pipe to the lowest priority pipe. A data packet can be assigned to one of the logical pipes based on a predetermined QOS level chosen by the user. The round robin method involves rotating the delivery of an identical number of data packets from the allocated pipes, starting with the pipe with the highest priority level to the pipe with the lowest priority level then circling back to the initial pipe. Therefore, all the allocated pipes are utilized equally regardless of their respective QOS level.

Another round robin method is a weighted round robin (WRR) queuing. Weighted round robin queuing utilizes the higher priority pipes more frequently than the lower priority pipes. That is a greater number of data packets are sent from the higher priority pipes than from the lower priority pipes for each rotation through the allocated logical pipes.

However these methods do not utilize any recent traffic condition on the allocated pipes as a transaction criterion. This traffic condition aspect is generally treated by a network congestion control function and more particularly by a traffic policing process, which is typically performed at the network control points, such as routers and bridges. In order to track packet transmission performance, one method utilizes a Round Trip Time (RTT) evaluation for the transmitted data packets. An RTT represents a time interval between the sending of a packet and the receipt of its delivery acknowledgement, and is a key function in many reliable transport protocols.

Furthermore, to keep a preferable packet transmission performance on the allocated logical pipes, an accurate running estimate of RTT's corresponding to recently transmitted packets can be useful. Indeed, a process that might help predict future RTTs on these logical pipes might help ISP's meet the users desired QOS levels by rearranging or redistributing, for an appropriate period of time, the usage of the allocated logical pipes.

Hence, a transaction routing method that utilizes appropriate priority among pipes as well as recent traffic network conditions would be desirable to ensure that each user gets the quality of service (QOS) it has been guaranteed on the Internet. Accordingly, there is a need for a transaction routing method that optimizes the transmission of data packets on the Internet, and is concerned with effectively providing a user desirable QOS level.

SUMMARY OF THE INVENTION

In one embodiment, a method for providing optimal transaction routing for data packets through a network on a plurality of logical pipes includes assigning each data packet to one of the plurality of logical pipes, with each logical pipe having an assigned numerical service level, and associating a numerical priority-usage level to each of the data packets. The method further including establishing a numerical threshold return-time-out (RTO) for each logical pipe, and transmitting data packets from one of the logical pipes and evaluating a running estimate of round trip times (RTT) for the transmitted data packets from the logical pipe being serviced. The method further includes transitioning to a subsequent logical pipe in a round robin manner once a combination of numerical bandwidth-usage levels for the delivered data packets has at least equaled the numerical service level for the logical pipe being serviced or once a current estimate of the round trip times for the delivered packets has at least equaled the threshold RTO for the logical pipe being serviced.

BRIEF DESCRIPTION OF THE DRAWINGS

The invention, together with the advantages thereof, may be understood by reference to the following description in conjunction with the accompanying figures, which illustrate some embodiments of the invention.

FIG. 1 is a functional block diagram illustrating an example network suitable for optimal transaction routing of data packets on a plurality of logical pipes.

FIG. 2 is a functional block diagram illustrating examples of allocated logical pipes and their respective assigned data packets queued for delivery to the Internet.

DETAILED DESCRIPTION

Figure 3:
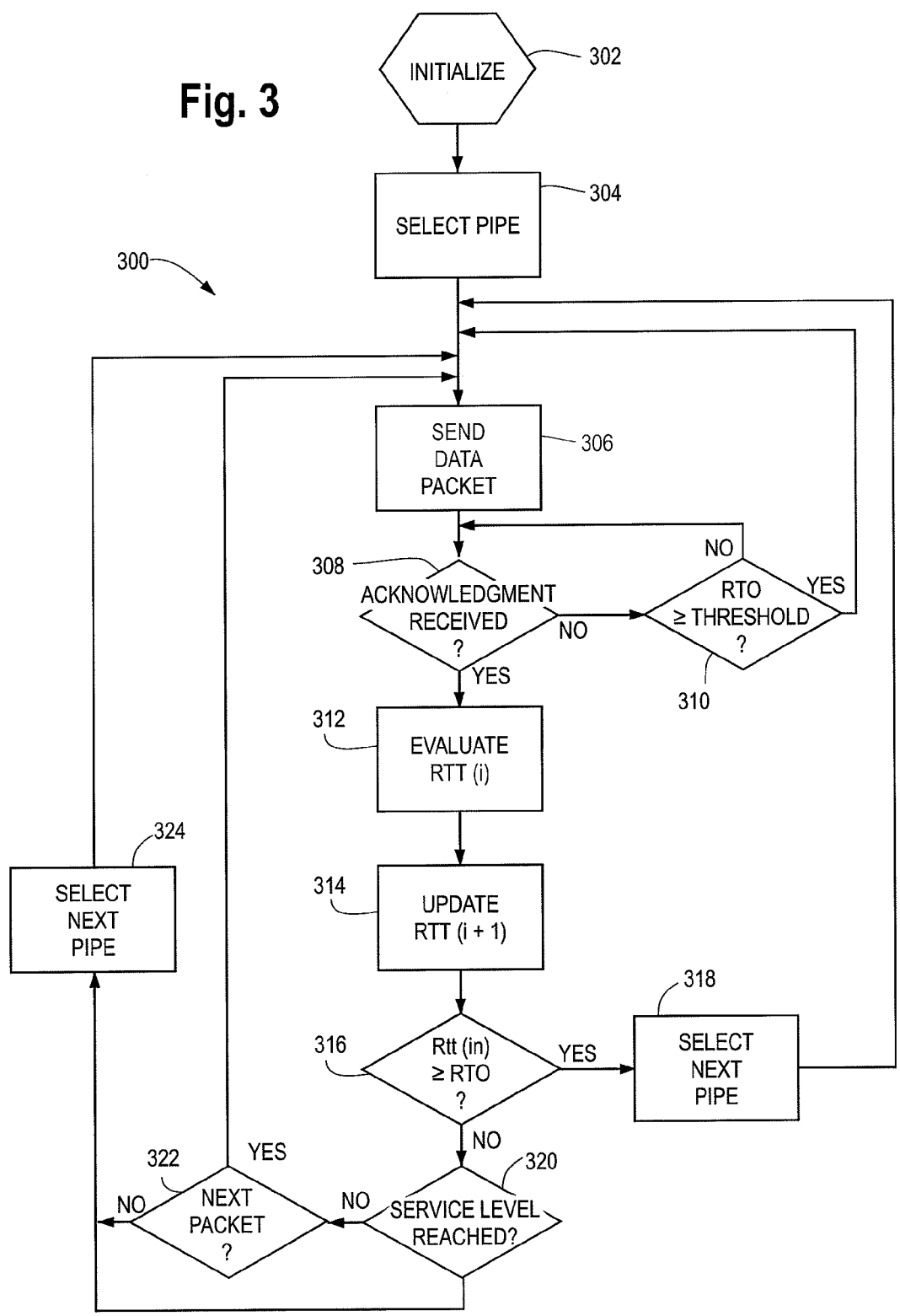
FIG. 3 is a flow chart illustrating one embodiment of a method for providing transaction routing for data packets though a communication network on a plurality of pipes.

While the present invention is susceptible of embodiments in various forms, there is shown in the drawings and will hereinafter be described exemplary embodiments with the understanding that this disclosure is not intended to limit the invention to the specific embodiments illustrated.

It should be further understood that the title of this section of this specification, namely, "Detailed Description", relates to a requirement of the United States Patent Office, and does not imply, nor should it be inferred to limit the subject matter disclosed herein.

In the present disclosure, the use of the disjunctive is intended to include the conjunctive. The use of the definite article or indefinite article is not intended to indicate cardinality. In particular, a reference to "the" object or "a" object is also intended to denote a possible plurality of such objects.

From the foregoing it will be observed that numerous modifications and variations can be effectuated without departing from the true spirit and scope of the novel concepts disclosed herein. It is to be understood that no limitation with respect to the specific embodiments illustrated is intended or should be inferred. The disclosure is intended to cover by the appended claims all such modifications as fall within the scope of the claims.

Referring to FIG. 1, a functional block diagram 100 illustrates one embodiment of a communication network 100 suitable for optimal transaction routing of data packets on a plurality of logical pipes. The communication network 100 connects the Internet 104 or any other suitable network for example an Extranet or Intranet, etc . . . to a source host 102. The source host 102, that may, for example, be serving as an Internet Service Provider (ISP), may include a router, a gateway, or any other comparable communication device. The communication network 100 comprises the source host 102 coupled to a number of destination hosts 106 via the Internet 104. The communication network 100 allows the source host 102 to transmit data packets though the Internet 104 to a multitude of destination hosts 106.

Typically, networks are composed of computers that are connected to each other via a shared electrical (i.e. wire) or wireless connection. A computer can only communicate directly to other computers that share the same network. The Internet makes possible communication between computers that reside in separate networks. Technically, each "routed" data packet receives the same attention for its transmission through the networks. However, this situation remains true only while the networks maintain adequate capacity for their corresponding packet traffic. A network capacity may be hindered if it is surpassed by the demand, or if one or several major routes are lost due to critical routers breakdowns, for example.

Referring to FIG. 2, a functional block diagram 200 illustrates one embodiment of allocated logical pipes 204 and their respectively assigned data packets 206 queued for delivery to the Internet 208. As shown, a plurality of allocated pipes 204 represents logical communication channels that partition connection between routers or gateways.

A data packet 206, once received by the source host 202, is automatically assigned to one of a plurality of logical pipes 206. Each logical pipe 206 is assigned a numerical service level. This numerical service level reflects the priority level of its corresponding logical pipe in comparison to the other logical pipes 206. In addition, a numerical priority-usage level is associated to each of the assigned data packets 206.

In one embodiment, data packets 206 are transmitted from one of the allocated logical pipes 204 until a combination of numerical priority-usage levels for the delivered data packets 206 has equaled or exceeded the numerical service level for the logical pipe 204 being serviced, or when a current estimate of the RTT for the delivered packets 206 has equaled or exceeded a threshold RTO for the logical pipe 204 being serviced. Once at least one of the above criteria has been met, the method transitions to transmitting data packets 206 from at least one other logical pipe 204 in a round robin manner.

In some embodiments a computation of the running estimate of the RTT for the transmitted data packets 206 can be performed to predict future RTT's, which can translate into future traffic conditions on the Internet. This computation can be accomplished, for example, by sampling the behavior of the transmitted data packets 206 sent over a logical pipe 204 and averaging those samples into a "smoothed" running estimate of the RTT. In effect, when a data packet 206 is transmitted over a corresponding logical pipe 204, the source host 202 can determine how long it takes for the packet transmission to be acknowledged, thereby producing a sequence of RTT samples S(i), where "i" is an integer. Therefore, with each new sample S(i), the new RTT is computed as follows:

$$RTT(i+1)=A*RTT(i)+(1-A)*S(i)$$

Where RTT(i) is the current estimate of the round-trip time, and RTT(i+1) is the new computed value. Also, A is a constant between 0 and 1 that controls how rapidly the RTT adapts to change.

In addition, the return-time-out (RTO), which is the amount of time that the source host 202 will wait for a given transmitted data packet 206 to be acknowledged before retransmitting it can, for example, be selected as follows:

$$RTO>=B*RTT(i)$$

Where B is a constant greater than 1, chosen such that there is an acceptably small probability that the RTT(i) for the transmitted data packet 206 may exceed the selected RTO. The RTO's may have different values for different logical pipes 204, such that a higher priority service level logical pipe 204 may utilize a smaller RTO value than a lower priority service level logical pipe 204.

FIG. 3 shows a flow chart illustrating one embodiment of a method 300 for providing transaction routing for data packets though a communication network on a plurality of pipes. Upon startup, an initialization process is performed, at step 302, and the RTT(i) is set at zero, i.e. RTT(i)=0 for i=0. Then a logical pipe is selected at step 304 to begin the transmission of its corresponding data packets. The data packets may be sent on a FIFO basis, or on a priority-usage level basis chosen by the user. After a data packet has been transmitted at step 306, an acknowledgment check, that the data packet was received at the designated destination host, is sought at step 308. If no acknowledgment is received before a time greater than the chosen RTO has elapsed, the data packet is retransmitted. It is important to note that the RTT(i) value for the current data packet continues to accrue during its retransmission.

Once the acknowledgement is received, RTT(i) is evaluated at step 312, and the running estimate RTT(i+1) is updated for the logical pipe being currently serviced, at step 314. If the current running estimate RTT(i) for the current logical pipe is equal to or exceeds the RTO value chosen for the current logical pipe, at step 316, then the method transitions to transmitting data packets from the subsequent logical pipe in a round robin manner at step 318. Otherwise, a check as to whether a combination of numerical priority-usage levels for the delivered data packets has equaled or exceeded the numerical service level for the logical pipe being serviced is performed at step 320. In the negative, another data packet is selected for transmission from amongst all the queued data packets based on its priority-usage level, at step 322. Otherwise, the method transitions to transmitting data packets from the subsequent logical pipe in a round robin manner at step 324.

The above method may, for example, be performed by the source host computer/server 202, which may also be a router or some other processor using instructions that may reside on a computer-readable medium. The computer-readable medium may be any suitable computer readable storage medium such as, but not limited to random access memory, read-only memory, flash memory, CDROM, DVD, solid-state memory, magnetic memory, and optical memory.

Another embodiment would recognize that the optimization of any transaction routing may encompass not only a priority-usage cost assignment, but also takes into account other factors such as bandwidth-usage of the logical pipes, and their security to prevent illicit interception of data packets. In addition, a user's priorities may change from time to time, and the requirements regarding the transmission of one data packet may be different than the requirements of another data packet. That is, a user may want to transmit one packet in an emergency situation at the fastest speed, regardless of its cost. Other files may need high security from being illicitly intercepted, and yet other files may only need to be transmitted at the lowest cost at any time in the near future, with no speed concerns.

Specific embodiments of a novel method and apparatus for optimal transaction Internet Protocol (IP) routing based on quality of service (QOS) and routing statistics of allocated pipes has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover any and all modifications, variations, or equivalents that fall within the true spirit and scope of the basic underlying principles claimed herein.

The invention claimed is:

1. A method for providing optimal transaction routing of data packets through a network on a plurality of logical pipes, comprising:
    assigning each data packet to one of the plurality of logical pipes, each logical pipe having an assigned numerical service level;
    associating a numerical priority-usage level to each of the assigned data packets;
    establishing a numerical threshold return-time-out (RTO) for each logical pipe;
    transmitting data packets from one of the logical pipes and evaluating a running estimate of round trip times (RTT) for the transmitted data packets from the logical pipe being serviced; and
    transitioning to a subsequent logical pipe in a round robin manner once a combination of numerical priority-usage levels for the delivered data packets has at least equaled the numerical service level for the logical pipe being serviced, or once a current estimate of the RTT for the delivered packets has at least equaled the threshold RTO for the logical pipe being serviced.

2. The method for optimal transaction routing of data packets through a network on a plurality of logical pipes, as in claim 1 further comprising modifying the numerical service level of one of the logical pipes.

3. The method for optimal transaction routing of data packets through a network on a plurality of logical pipes, as in claim 1 further comprising modifying the numerical priority-usage level of an assigned data packet.

4. The method for optimal transaction routing of data packets through a network on a plurality of logical pipes, as in claim 1 further comprising transmitting the data packets on a FIFO basis from the logical pipe being serviced.

5. The method for optimal transaction routing of data packets through a network on a plurality of logical pipes, as in claim 1 further comprising transmitting the data packets on a priority-usage basis from the logical pipe being serviced.

6. The method for optimal transaction routing of data packets through a network on a plurality of logical pipes, as in claim 1 further comprising evaluating a running estimate of the current RTT for the transmitted data packets from a sequence of RTT samples, wherein each sample is associated with a particular transmitted data packet from the logical pipe being serviced.

7. The method for optimal transaction routing of data packets through a network on a plurality of logical pipes, as in claim 1 wherein a predetermined numerical threshold RTO is selected to be equal to or greater than an RTT scaled by a constant B, where B is greater than 1 chosen such that there is an acceptably small probability that the RTT for the transmitted data packet may exceed the selected RTO.

8. The method for optimal transaction routing of data packets through a network on a plurality of logical pipes, as in claim 7 wherein the RTO has different values for different logical pipes.

9. The method for optimal transaction routing of data packets through a network on a plurality of logical pipes, as in claim 7 wherein the data packet is retransmitted when a time interval greater than the chosen RTO for the logical pipe being serviced has elapsed before an acknowledgment is received.

10. The method for optimal transaction routing of data packets through a network on a plurality of logical pipes, as in claim 9 wherein an RTT value for the current data packet continues to accrue during its retransmission.

11. A system for providing optimal transaction routing of data packets through a network on a plurality of logical pipes, comprising:
  means for assigning each data packet to one of the plurality of logical pipes, each logical pipe having an assigned numerical service level;
  means for associating a numerical priority-usage level to each of the assigned data packets;
  means for establishing a numerical threshold return-time-out (RTO) for each logical pipe;
  means for transmitting data packets from one of the logical pipes and evaluating a running estimate of round trip times (RTT) for the transmitted data packets from the logical pipe being serviced; and
  means for transitioning to a subsequent logical pipe in a round robin manner once a combination of numerical priority-usage levels for the delivered data packets has at least equaled the numerical service level for the logical pipe being serviced or once a current estimate of the RTT for the delivered packets has at least equaled the threshold RTO for the logical pipe being serviced.

12. The system for optimal transaction routing of data packets through a network on a plurality of logical pipes, as in claim 11 further comprising means for modifying the numerical priority-usage level of an assigned data packet.

13. The system for optimal transaction routing of data packets through a network on a plurality of logical pipes, as in claim 11 further comprising means for transmitting the data packets on a priority-usage basis from the logical pipe being serviced.

14. The system for optimal transaction routing of data packets through a network on a plurality of logical pipes, as in claim 11 further comprising means for evaluating a running estimate of the current RTT for the transmitted data packets from a sequence of RTT samples, wherein each sample is associated with a particular transmitted data packet from the logical pipe being serviced.

15. A computer-readable medium having encoded therein computer-executable instructions for performing a method providing optimal transaction routing of data packets through a network on a plurality of logical pipes, the method comprising:
  assigning each data packet to one of the plurality of logical pipes, each logical pipe having an assigned numerical service level;
  associating a numerical priority-usage level to each of the assigned data packets;
  establishing a numerical threshold return-time-out (RTO) for each logical pipe;
  transmitting data packets from one of the logical pipes and evaluating a running estimate of round trip times (RTT) for the transmitted data packets from the logical pipe being serviced; and
  transitioning to a subsequent logical pipe in a round robin manner once a combination of numerical priority-usage levels for the delivered data packets has equaled or exceeded the numerical service level for the logical pipe being serviced or once that the current estimate of the RTT for the delivered packets has equaled or exceeded the threshold RTO for the logical pipe being serviced.

16. The computer-readable medium having computer-executable instructions for performing the method for optimal transaction routing of data packets through a network on a plurality of logical pipes, as in claim 15 further comprising modifying the numerical service level of one of the logical pipes.

17. The computer-readable medium having computer-executable instructions for performing the method for optimal transaction routing of data packets through a network on a plurality of logical pipes, as in claim 15 further comprising modifying the numerical priority-usage level of an assigned data packet.

18. The computer-readable medium having computer-executable instructions for performing the method for optimal transaction routing of data packets through a network on a plurality of logical pipes, as in claim 15 further comprising transmitting the data packets on a FIFO basis from the logical pipe being serviced.

19. The computer-readable medium having computer-executable instructions for performing the method for optimal transaction routing of data packets through a network on a plurality of logical pipes, as in claim 15 further comprising transmitting the data packets on a priority-usage basis from the logical pipe being serviced.

20. The computer-readable medium having computer-executable instructions for performing the method for optimal transaction routing of data packets through a network on a plurality of logical pipes, as in claim 15 further comprising evaluating a running estimate of the current RTT for the transmitted data packets from a sequence of RTT samples, wherein each sample is associated with a particular transmitted data packet from the logical pipe being serviced.

21. A system for performing optimal transaction routing of data packets through a network on a plurality of logical pipes, the system comprising:

at least one processor programmed to assign each data packet to one of the plurality of logical pipes, each logical pipe having an assigned numerical service level; associate a numerical priority-usage level to each of the assigned data packets; establish a numerical threshold return-time-out (RTO) for each logical pipe; transmit data packets from one of the logical pipes and evaluating a running estimate of round trip times (RTT) for the transmitted data packets from the logical pipe being serviced; and transition to a subsequent logical pipe in a round robin manner once a combination of numerical priority-usage levels for the delivered data packets has equaled or exceeded the numerical service level for the logical pipe being serviced or once that the current estimate of the RTT for the delivered packets has equaled or exceeded the threshold RTO for the logical pipe being serviced.

22. The system for performing the method for optimal transaction routing of data packets through a network on a plurality of logical pipes, as in claim 21 further comprising:

at least one processor programmed to modify the numerical service level of one of the logical pipes.

23. The system for performing the method for optimal transaction routing of data packets through a network on a plurality of logical pipes, as in claim 21 further comprising:

at least one processor programmed to transmit the data packets on a priority-usage basis from the logical pipe being serviced.

24. The system for performing the method for optimal transaction routing of data packets through a network on a plurality of logical pipes, as in claim 21 further comprising:

at least one processor programmed to evaluate a running estimate of the current RTT for the transmitted data packets from a sequence of RTT samples, wherein each sample is associated with a particular transmitted data packet from the logical pipe being serviced.

* * * * *